INVENTORS
NORMAN C. WILLIAMS
ROLLIN W. FISHWOOD
BY
ATTORNEY

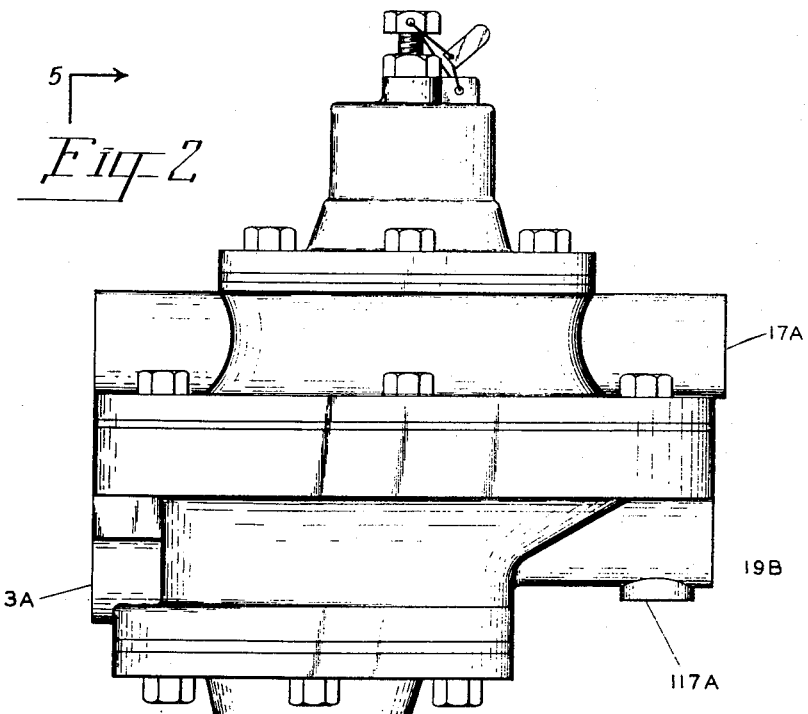
Fig-2
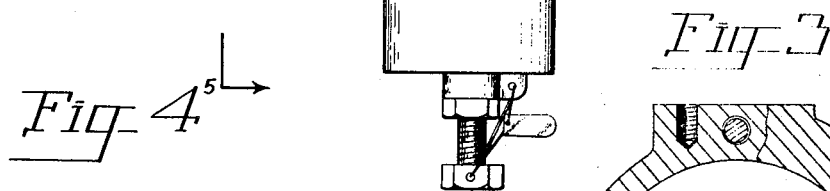
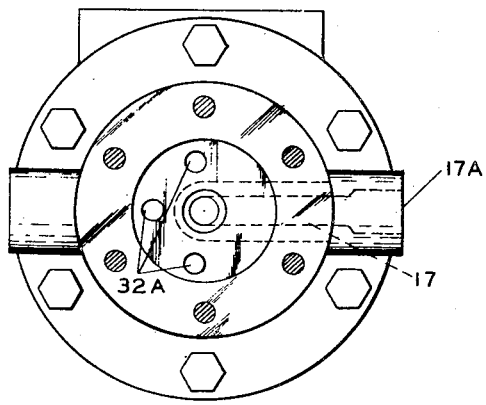
Fig-4
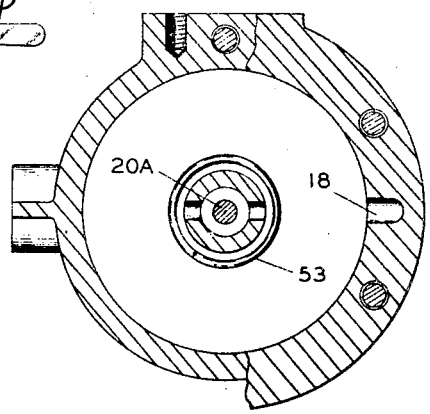
Fig-3
INVENTORS
NORMAN C. WILLIAMS
ROLLIN W. FISHWOOD
BY
*G. F. McS. Dougall*
ATTORNEY Oct. 12, 1948.　　　N. C. WILLIAMS ET AL　　　2,451,139
AUTOMATIC CONTROL INSTRUMENT
Filed June 1, 1946　　　　　　　　　　　　　4 Sheets-Sheet 3
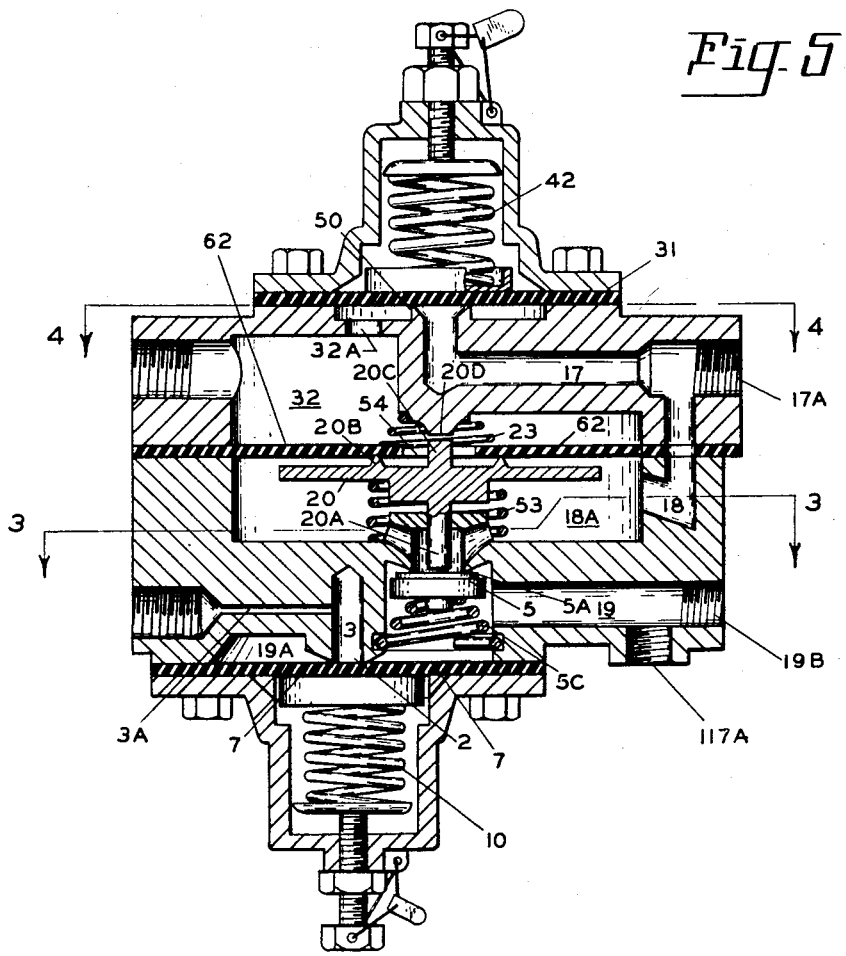
INVENTORS
NORMAN C. WILLIAMS
ROLLIN W. FISHWOOD
BY
G. J. McDougall
ATTORNEY

Patented Oct. 12, 1948

2,451,139

UNITED STATES PATENT OFFICE 2,451,139

AUTOMATIC CONTROL INSTRUMENT

Norman C. Williams and Rollin W. Fishwood, Portland, Oreg., assignors to Power Brake Equipment Co., Portland, Oreg.

Application June 1, 1946, Serial No. 673,734

15 Claims. (Cl. 188—3)

This invention relates to an automatic air line control instrument for truck, trailer systems using "air" braking systems. "Truck" and "tractor" are used interchangeably in the art as meaning the same thing.

Each vehicle, conventionally, has a complete braking system, save that the air compressor and all of the manually operated controls are on the truck. The trailer has an emergency compressed air reservoir, which operates to immediately apply brakes to the trailer in cases of accidental uncoupling of the two vehicles; but, ordinarily, leaves the towing vehicle without effective brakes.

It is the underlying object of this invention to improve the brake system by supplying an automatically operating instrument effective to maintain an operative working pressure on the truck half of the double vehicle, in case of such mischance.

To act as an automatic shut-off to stop escape of air pressure from the truck brake system, thereby rendering it unserviceable; in case of emergency uncoupling of the trailer therefrom.

To take the place of the conventional shut-off cocks between tractor and trailer, neglect of which has been a source of accidents.

To permit the operator from his place within the cab of the tractor to apply emergency brake action to the trailer at any time, concurrently conserving the air supply on the tractor, and again restore normal braking conditions at will. In other words, the emergency trailer system may be operated while the tractor operates without braking action. So far as we are aware, this is a new function made possible by our invention.

To limit the loss of air pressure on the tractor vehicle to a minimum of 50 pounds, or other predetermined amount, in case of accidental parting of the hose lines between trailer and tractor when brake application is as full "on."

The foregoing and many other articles will be apparent to those familiar with air braking systems from the following specification, the novel features of which are particularly pointed out in the claims.

Drawings accompany and form a part hereof, in which—

Fig. 1 is a diagrammatic air brake system that includes our automatic control instrument, near the center of the figure, which will be identified from—

Fig. 2, which is a side view of the instrument of the invention turned from the position it is shown in Fig. 1, and considerably enlarged;

Fig. 3 is a vertical cross-section of the instrument of the invention, taken on the line 3—3 of Fig. 5;

Fig. 4 is a cross-section of Fig. 5 on the line 4—4 of Fig. 5;

Fig. 5 is a section of Fig. 2 on the line 5—5 of Fig. 2; and

Figure 1:
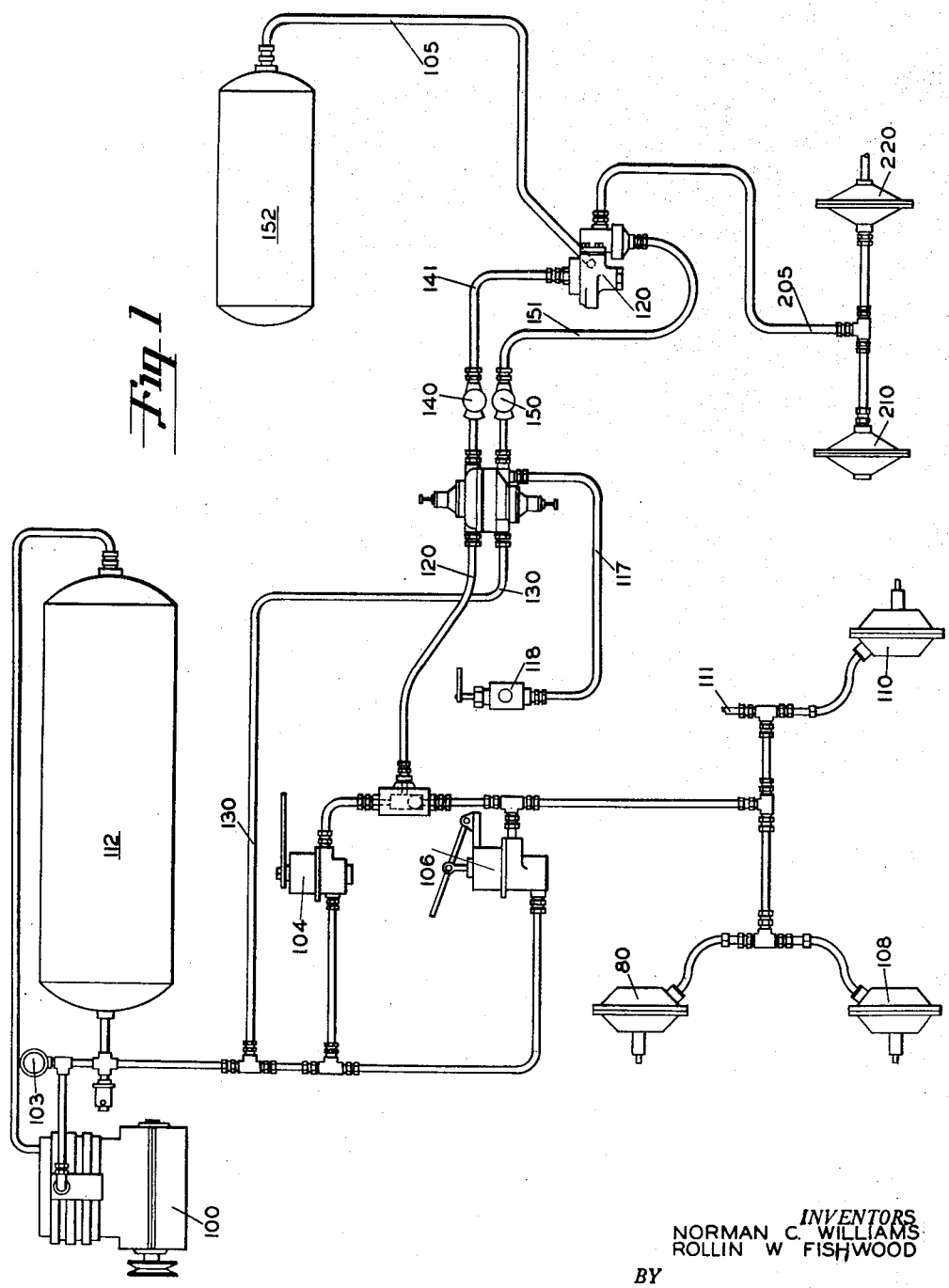

Describing the drawings in more detail and beginning with the diagrammatic brake layout in Fig. 1, and referring also to Fig. 5. Air pressure is delivered from the tank 112 through the pipe 130 to the port 3A and to the terminus 2 of the port 3 at all times throughout the operation of the instrument of the invention. In order to build the air pressure up in the tank 152 located on the trailer, the following operation takes place.

The hand valve 104 is operated, delivering air through the pipe 120 into the chamber 32 of our instrument. When this air enters the chamber 32, it forces the diaphragm 62 and the diaphragm plate 20 down against the spring 53. This forces the plunger 20A, forming part of the plate 20, down against the valve 5, unseating said valve from its seat 5A.

When air from the control valve 104 enters the chamber 32, it has to build a pressure of approximately 50 lbs. within this chamber before it will lift the diaphragm 31 against the spring 42, allowing air to pass through the port 32A and out through the valve seat 50, which is opened by the raising of the diaphragm 31. This overflow of air enters the passageway 17, passing out of the port 17A into the service line 141 to the emergency relay valve 120, which is located on the trailer; although on reaching the relay valve in this operation nothing happens within the relay relative to the charging of the tank 152. Simultaneously therewith air passes through the passageway 18 into the chamber 18A, down through the opened valve 5, building up a pressure in the passage 19 and chamber 19A, also from the passage 19 through the port 19B into the emergency line 151 to the relay 120.

Simultaneously therewith the pressure built up within the chamber 19A forces the diaphragm 7 against the spring 10 when the pressure has reached approximately 40 lbs. This opens the port 3 at 2, allowing the pressure of the tank 112 to enter this chamber 19A, passageway 19 and out through the emergency line 151 to the relay, entering the port 151', flowing past the diaphragm 151'', into the chamber 151''', out the port 105' through the pipe 105 to the storage tank 152 located on the trailer, bringing this storage tank up to the pressure of that within the tank 112.

Figure 6:
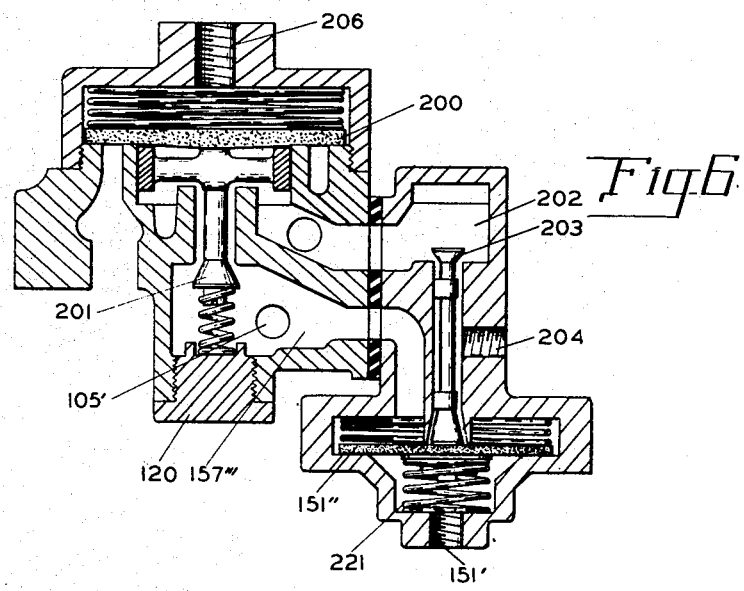
Figs. 6 and 7 represent normal and emergency brake application positions of a conventional emergency relay valve that cooperates with our instrument of the invention.
Figure 7:
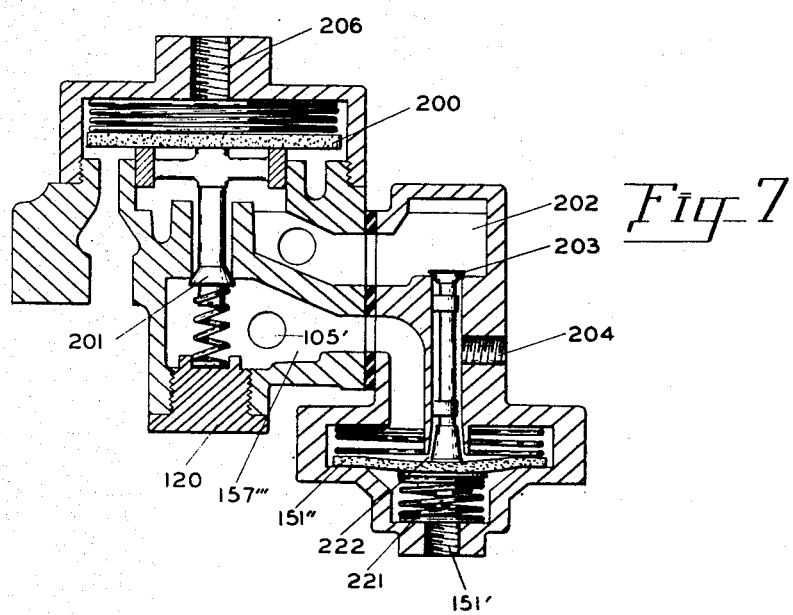

It will be noted in Fig. 6 that the diaphragm 200 was depressed by air pressure from the port 17A through the service line 141 when the control valve 104 was manipulated. This opened up the valve 201 allowing air pressure to pass therethrough into the chamber 202 through the valve 203, which was opened by the pressure through the emergency line 151. This then allows air to pass out the port 204 to the line 205 to the brake applicators 210 and 220. This flow, however, is only momentary because when the pressure from the main tank 112 builds up the pressure within the chamber 18A to balance the air pressure developed in the chamber 32, the valve 5 will be closed by the action of the diaphragm 62 being forced against the tension of spring 23, allowing the spring 53 to raise the diaphragm plate 20 and its stem 20A, which allows the spring 5C to close the valve 5 against its seat 5A.

When the valve 104 is brought to exhaust position, the pressure in the chamber 32 will be exhausted and the pressure remaining within the chamber 18A will force the diahragm 62 up against the spring 23, unseating the same from the seal 20B, permitting the air within the chamber 18A to pass through the opening 54 into the chamber 32 and out through the control value 104. The movement upward of the diaphragm plate 20 is halted by the stem 20C engaging the stop 20D, thereby permitting the opening of the seal 20B and allowing the air to escape from the chamber 18A. The port 3 will be held open by the pressure on top of the diaphragm 7 as long as the pressure in the chamber 19A remains above approximately 40 lbs.

We will now describe a normal application of the brakes on the trailer. When the control valve 104 on the truck is operated to admit a pressure within the chamber 32, the diaphragm 62 will be forced down and the diaphragm plate and its stem 20A will contact the valve 5 opening the same, permitting air to flow from the chamber 19A or from the emergency line 151 into the chamber 18A, passage 18, out ports 17A to the port 206 of the emergency relay valve 120 through the piping 141. This will open the valve 201 permitting air to flow from the chamber 151''' into the chamber 202 and out through the valve 203, port 204, to the line 205 operating the brake applicators 210 and 220.

Due to the fact that air pressure is being maintained within the emergency line 151, the valve 203 will be maintained in an open position permitting this flow of air from the chamber 151''' to the brake applicators. When the air in the chamber 18A builds up to that equal to that applied by the valve 104 into the chamber 32, the valve 5 will be closed as above described.

A well known principle of relay valve is here used, this being application of air pressure, from a controllable modulating source, to depress a diaphragm or piston which in turn operates a valve exposed to high pressure permitting this high pressure to enter against the unbalanced surface of the first diaphragm or piston. When pressure on said unbalanced side reaches a balance with the first applied pressure, suitable springs cause the valve to close preventing the admission of more air from the high pressure source.

Describing the operation of the safety devices of the instrument of the invention and their mode of operation: If the line 151 is parted, either accidentally or purposely, or any other abnormal condition causes rapid loss of air pressure, the air contained in the chamber 19A over the diaphragm 7, escapes through connecting passages such as 19D and the line 151, when due to the restricted area of port 3A, the spring 10 promptly closes off port 3A, preventing loss of tank pressure.

The valve 50, it will be remembered, is insensitive to pressures below its set pressure, say 50 pounds per square inch, hence loss of air from the reservoir 112, even if the controls 104 and 105 are meanwhile wide open, is limited to a minimum of fifty lbs., thus leaving the truck with an excellent operating pressure for its brakes as compared with complete "loss of air," which has been the underlying reason for a multitude of accidents.

When the truck operator wishes to avail himself of the ability to apply the trailer emergency braking system, he can open valve 118 connected indirectly to line 151 through conduit 117, producing precisely the effect of a break in line 151, save that it is easy to restore normal service by closing the valve, following by recharging the emergency line as described supra.

Should service line 141 be parted or spring a heavy leak, when brakes are applied, pressure through valve 5 will escape to atmosphere instead of going to the relay valve to cause setting of trailer brakes. With valve 5 open, pressure in chamber 19A falls below the critical amount and valve 2 closes off flow from reservoir 112, the same result exactly insofar as the relay emergency valve is concerned, an immediate emergency application of the trailer brakes. If brakes are not being used when line 141 becomes unserviceable, nothing happens until a brake application is attempted.

Having described our invention so that those familiar with manufacture and/or operation of air braking systems can make and use it, what we claim as new and desire to secure by Letters Patent is:

1. In an automatic air line control, a plural valve instrument for placement between two supply conduits and two connecting conduits, a spring loaded valve assembly in said instrument effective to open only on a predetermined supply pressure that terminates one of said supply conduits, a spring loaded valve terminating the other supply conduit, unopenable by pressure therethrough, and means operable by air pressure above the predetermined set pressure that passes through said first named valve and effective to open said second valve and establish full pressure flow therethrough.

2. In an air line automatic control instrument, an inlet valve, means fixing an above atmosphere pressure at which it will yield to pressure and flow air therethrough, another inlet valve normally blocked against admitting air to the instrument, pneumatically operable means for unblocking said last named inlet valve operable solely by air that passes said first named valve after yielding to pressure.

3. The combination as claimed in claim 2 and including a check valve positioned to yield to pressure from said first named valve and permit flow to said unblocking means but close against return flow when the said second valve is opened.

4. The combination as claimed in claim 2 in which the unblocking means for said second inlet valve is held open by air that passes through the valve, for so long as the pneumatic pressure thereof exceeds a predetermined amount.

5. The combination as claimed in claim 2 in which said second inlet valve is so arranged that air cannot flow through it until it is unblocked by pneumatic pressure from said first named inlet valve which is resistant to air flow at pressure below that determined by the pressure fixing means, said inlets each having conduits attached thereto to provide air pressure to each from a common source at the same pressure.

6. An automatic control valve for dual braking systems, positionable between a truck and a trailer, comprising in combination, an initial inlet conduit, an automatic valve at the end of said conduit that requires a predetermined high pressure therearound before it will open, a second inlet conduit spaced from said first named conduit, both conduits connected to a common source of air pressure, spring loaded valve means controlling the terminus of said second inlet conduit, said means including a diaphragm conduit and channel means for conducting pressure that passes said first named valve to the side of the diaphragm opposite the said spring, to overcome the spring and open said spring loaded valve.

7. The combination as claimed in claim 6 in which the said diaphragm is arranged to be exposed to pressure passing through said second inlet valve to hold it open whereupon air flowing through said second inlet conduit takes over from that which must pass the loaded valve, and supplies full pressure of air from said common source.

8. An automatic air line control instrument for truck, trailer brake systems, wherein the trailer has an auxiliary air supply and a relay valve comprising in combination therewith a spring loaded diaphragm inlet valve that will admit air to the trailer after it exceeds a predetermined high pressure and opens the valve, a second inlet valve restricted to one way air flow from truck to trailer, a spring loaded diaphragm that normally prevents flow in either direction, means operable to establish normal flow through said second inlet valve, said means operable solely by pneumatic force that flows through said first named valve when it has opened by pressure above the predetermined pressure required to operate its loaded diaphragm.

9. In a dual air brake system for truck, trailer combination vehicles where the trailer has an auxiliary air reservoir with a relay emergency brake applying valve, an automatic air line control instrument positioned on the tractor and connected to the emergency line of said relay valve, the operating valves of said air line control instrument concurrently serving as one way inlet means for supplying compressed air to said auxiliary reservoir, with a manual control valve connected between said operating valves and said relay emergency valve, operable to cause an emergency brake application of the trailer system without affecting the brakes on the truck, the said control instrument effective to restore the trailer brakes to normal operating condition after the single emergency application by setting of brakes on both tractor and trailer and then releasing all brakes together.

10. In an air line automatic instrument, an inlet valve, means fixing an above atmosphere pressure at which said valve will yield to pressure and flow air therethrough, another inlet valve normally blocked against admitting air to said instrument, pneumatically operable means for unblocking said last named inlet valve initially solely operable by air that passes said first named valve after yielding to pressure, said unblocking means so formed and arranged that when initially operated, normal pressure derived from said unblocked inlet will hold said means in operative condition.

11. In an air line automatic control instrument, a normally blocked main inlet valve, an auxiliary inlet valve spring loaded to open only after a predetermined pressure is reached, pneumatic means for opening said main inlet valve and operable by air that passes said auxiliary valve, said valve arranged to remain open afterwards by pressure flowing therethrough, a brake service conduit in operable connection with the discharge side of both inlet valves, a one way check valve that shuts against flow thereto from said main valve and remote manually controlled means associated with said auxiliary valve effective to open said check valve.

12. An air line control instrument comprising main and secondary air inlet valves, said main valve initially unopenable save by air pressure from said secondary valve but arranged to remain open by pressure flowing through it after being opened, said secondary valve spring loaded to remain closed until a raised predetermined pressure overcomes the spring, communication means connecting the discharge sides of said valves, said communication means connected to a brake service conduit, a check valve normally closing said main valve against said service conduit, and remote manually controllable means associated with said secondary air inlet valve effective to open said check valve to energize said service conduit.

13. An air line automatic control instrument having in combination therewith three normally spring closed valves, a diaphagm associated with each valve to open the same by pneumatic pressure on its diaphragm, a main valve, openings means therefor dependent upon air from a secondary valve for initial opening of said main valve, said main valve arranged to take over control of said opening means after initial opening, a secondary valve loaded to resist opening until a predetermined pressure is attained against its diaphragm, a brake service conduit associated with said main valve, a check valve stopping flow from said main valve to said brake service conduit and remote manual means for applying air pressure to the diaphragm of said check valve to selectively open the same.

14. In an air line automatic control instrument, a main air inlet structure, a valve controlling ingress of air therethrough, a secondary air inlet structure, means associated therewith for initially controlling the valve of said main air inlet structure, said main air inlet structure effective to take over such control being once opened with normal air pressure therein, a brake service conduit indirectly connected to said main inlet structure, a check valve between said main inlet structure and said brake service conduit and remotely controlled pneumatically operative means for selectively causing said check valve to open.

15. In an air line control instrument, an inlet valve, means fixing an above atmosphere pressure at which it will pass air therethrough, a second inlet valve normally unopenable by pressure tending to pass through it, pneumatically operable means for opening said second valve by air pressure that passes said first valve, a brake application service conduit and a diaphragm controlled valve responsive on one side by of its diaphragm portion to air pressure and on the other side thereof sensitive to brake application pressure, for admitting service air to said conduit.

NORMAN C. WILLIAMS.
ROLLIN W. FISHWOOD.

REFERENCES CITED

The following references are of record in the file of this patent:

UNITED STATES PATENTS

| Number | Name | Date |
| --- | --- | --- |
| 410,922 | Pritchard | Sept. 10, 1889 |
| 1,614,652 | Christensen | Jan. 18, 1927 |
| 1,797,431 | Mathieson | Mar. 24, 1931 |
| 2,084,707 | Robinson | June 22, 1937 |
| 2,232,883 | Neveu | Feb. 25, 1941 |